United States Patent [19]

Immonen

[11] Patent Number: 4,494,306
[45] Date of Patent: Jan. 22, 1985

[54] TOOL FOR ASSEMBLY OF HALVES OF A VALVE STEM KEY FOR RETAINING VALVE SPRINGS

[75] Inventor: Kari Immonen, Västerås, Sweden
[73] Assignee: ASEA Aktiebolag, Västerås, Sweden
[21] Appl. No.: 452,718
[22] Filed: Dec. 23, 1982
[30] Foreign Application Priority Data Dec. 28, 1981 [SE] Sweden .................................. 8107789

[51] Int. Cl.³ .............................................. B23Q 7/10
[52] U.S. Cl. .................................... 29/809; 29/213 R
[58] Field of Search ................. 29/213 R, 213 E, 214, 29/809, 813, 816, 157.1 R

[56] References Cited

U.S. PATENT DOCUMENTS 2,989,996  6/1961  Dixon .................................. 81/57.37
3,793,999  2/1974  Seiler et al. .......................... 29/213
3,864,804  2/1975  Kawaguchi ....................... 29/243.56

*Primary Examiner*—James L. Jones, Jr.
*Attorney, Agent, or Firm*—Watson, Cole, Grindle & Watson

[57] ABSTRACT

A tool for automatically mounting the halves of a split valve stem key in the bore of a spring-retaining washer and around the stem of a valve in a combustion engine. A tool is primarily intended to be used in combination with a handling robot. It comprises a pressure element for compressing a valve spring, magazines for the valve stem key halves, a transportation channel and a transportation member to bring the halves to the required position for assembly around the valve stem and in the washer.

5 Claims, 14 Drawing Figures

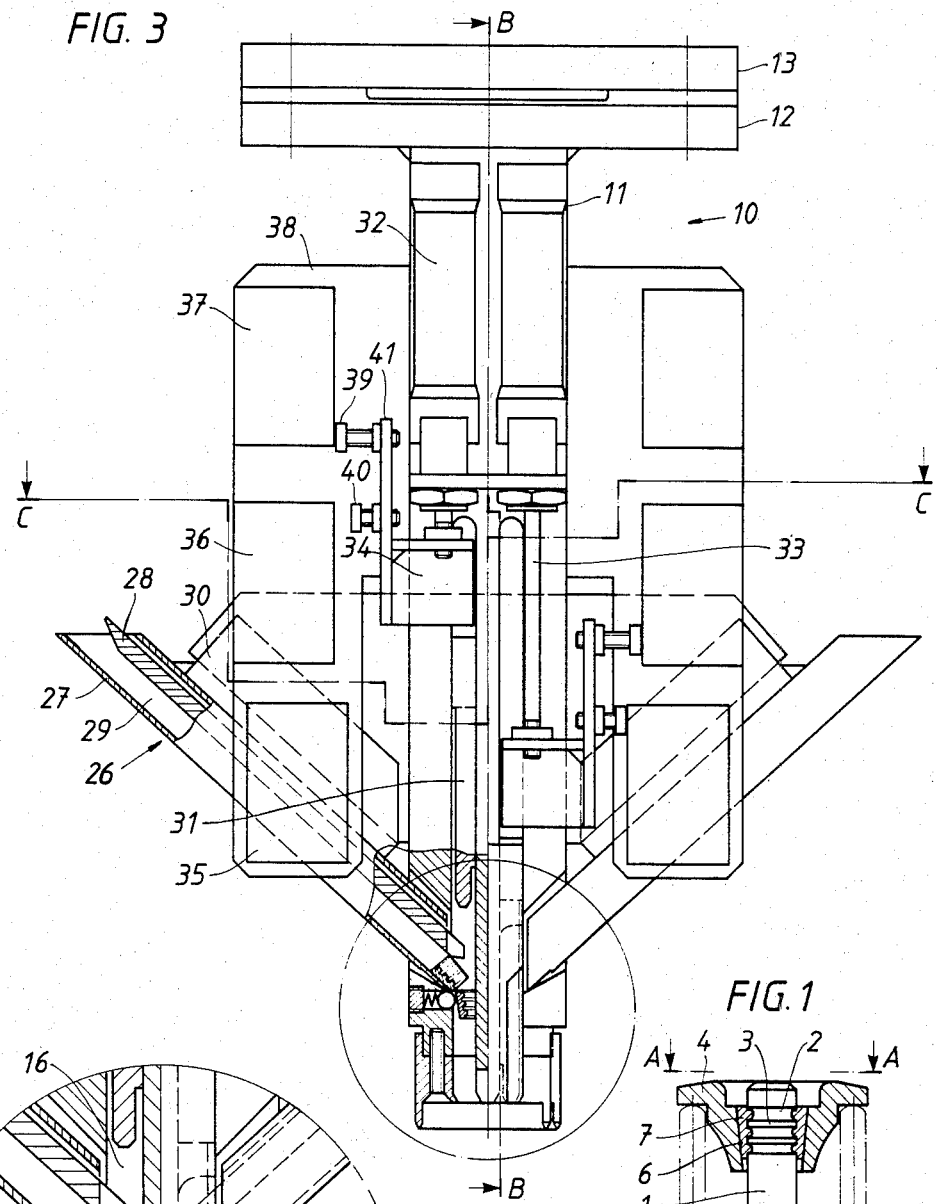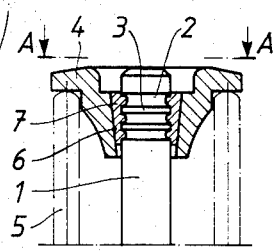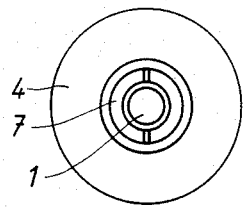

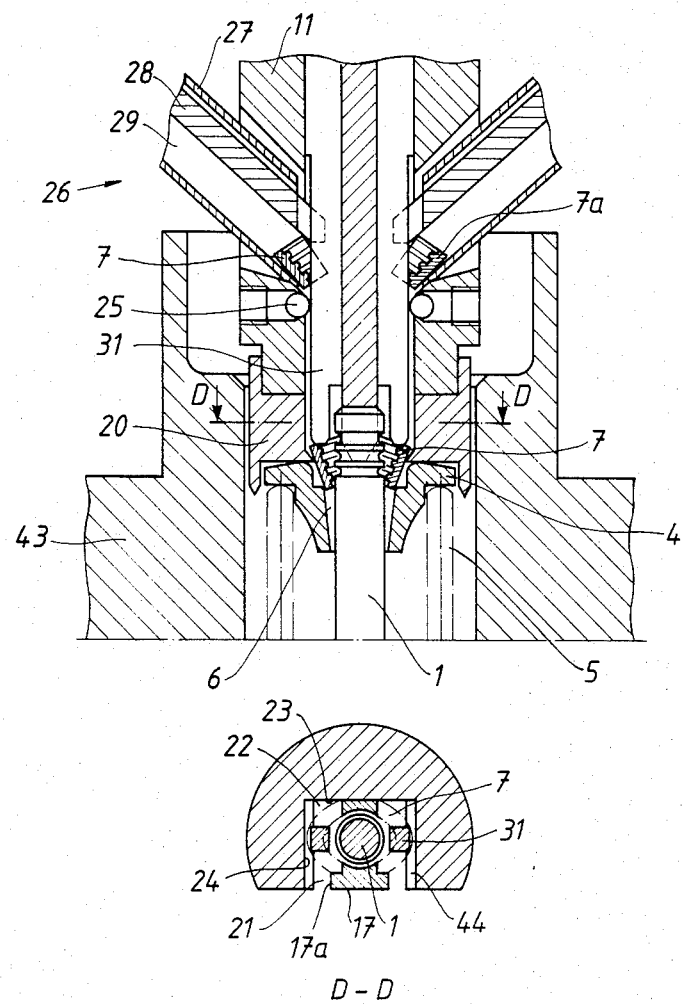

4,494,306

TOOL FOR ASSEMBLY OF HALVES OF A VALVE STEM KEY FOR RETAINING VALVE SPRINGS

TECHNICAL FIELD

This invention relates to a tool for employment in the automatic assembly of the spring package of valve gear in an internal combustion engine, and in particular to a tool for assembling the halves of a valve stem key (sometimes referred to as split cotters or split collets) between a spring-retaining washer and the stem of the valve.

DISCUSSION OF PRIOR ART

In combustion engines, the cylinder valves are urged in their closing direction by helical springs, which are located between the bottom of a bore in the cylinder head of the engine and a spring-retaining washer surrounding the outer end of the stem of the valve. The spring-retaining washer is usually formed with a frusto-conical bore and is secured to the valve stem by means of the two halves of a split valve stem key shaped to rest in the frusto-conical bore, the two key halves gripping the valve stem and being pressed against it by the spring force acting on the washer. For secure retention on the valve stem, the key halves are formed with internal grooves and flanges and the valve stem is provided with cooperating grooves and flanges. In this way a reliable, strong axial fixing is obtained between the valve stem and the surrounding washer with its frusto-conical bore, via the intermediary of the split valve stem key.

After the valves have been inserted into the cylinder head, the valve spring, with a lower and an upper washer, is placed around the valve stem and the spring is axially compressed. Two frusto-conical key halves are then located around the valve stem, whereafter the spring is allowed to expand, urging the frusto-conical washer up around the key halves to press the latter snugly against the valve stem and lock the valve spring in place.

This assembly procedure for each valve-two to four for each cylinder—is time-consuming, repetitive work, and one aim of this invention is to automate this assembly procedure. The correct positioning of the key halves around the valve stem, however, has caused problems. It is proved to be difficult to correctly locate the key halves around the valve stem so that they are properly received in the bore of the washer as the spring expands. The invention aims to provide a reliably working tool for the procedure described which, when operated by a robot, permits complete automation of the procedure.

BRIEF STATEMENT OF INVENTION

According to the invention, the tool comprises a pressure element which is designed to compress the spring to such an extent that a spring-retaining washer resting thereon is pressed down below the locking grooves and flanges at the outer end of the valve stem. Further there are provided magazines for a number of halves of the valve stem keys which, together with the washer, are designed to take up the spring force and transmit it to the valve stem of the valve. The tool comprises means for feeding forward one key half at a time to a channel which conducts the key halves down to an assembly position around the valve stem. The channel includes guiding members for the key halves, which hold the key halves at such a distance from each other that they can freely pass the upper end of the valve stem. Further, the transport channel contains displaceable members which bring the key halves to the desired position during the assembly and hold them in this position when the washer of a valve spring is allowed to rise up to retain the key halves in a bore thereof. The lower part of the transport channel comprises fixed or resilient means which move the key halves in towards the valve stem. The displaceable members can be operated by air cylinders.

The feeding of the key halves from the magazines can be carried out by feeding devices in the magazines or by a catch with a spring-loaded ball, or the like, at the transition from the magazine to the channel.

BRIEF DESCRIPTION OF DRAWINGS

Two embodiments of a tool in accordance with the invention, will now be described in greater detail, by way of example, with reference to the accompanying drawings in which:

FIG. 1 and 2 show a partial axial section and an end view, respectively, of valve gear comprising a valve washer which transmits the force of a valve spring to the stem of the valve, FIG. 3 shows a partially sectioned first embodiment of a tool according to the invention, FIG. 3a shows an enlarged sectional view of the lower end of the tool of FIG. 3, FIG. 6 is a section through the lower part of the tool of FIG. 3, FIG. 7 is a section on the line D—D in FIG. 6, and FIG. 8–13 show, in section, part of a second embodiment of a tool in accordance with the invention in the various positions employed during the assembly of the halves of a valve stem key within the bore of a valve spring-retaining washer.

DESCRIPTION OF FIRST EMBODIMENT

Figure 4:
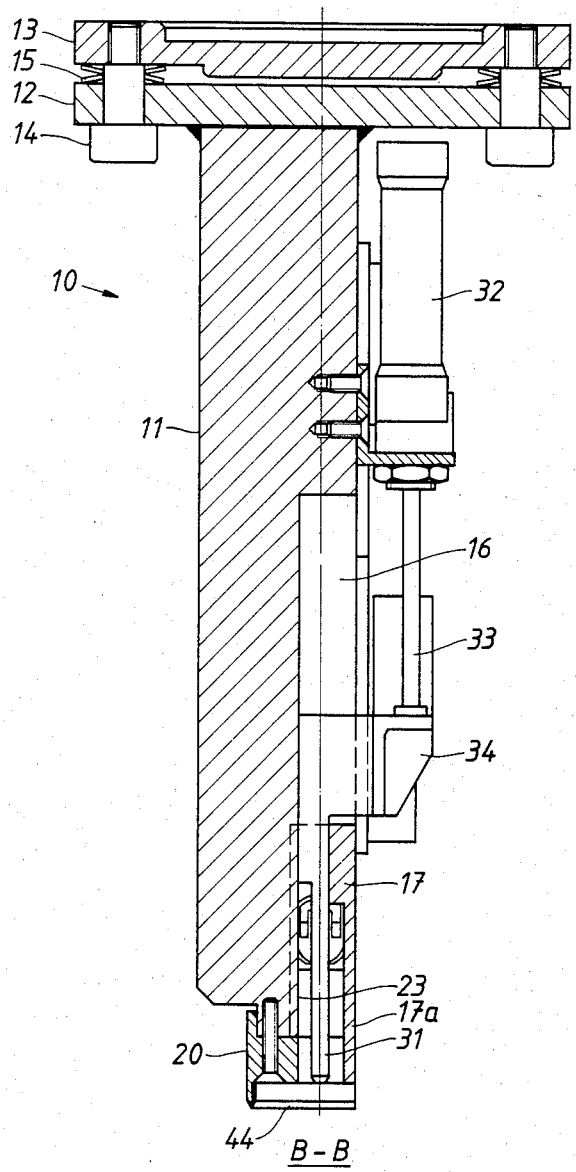
FIG. 4 is a section along the line B—B in FIG. 3.
Figure 5:
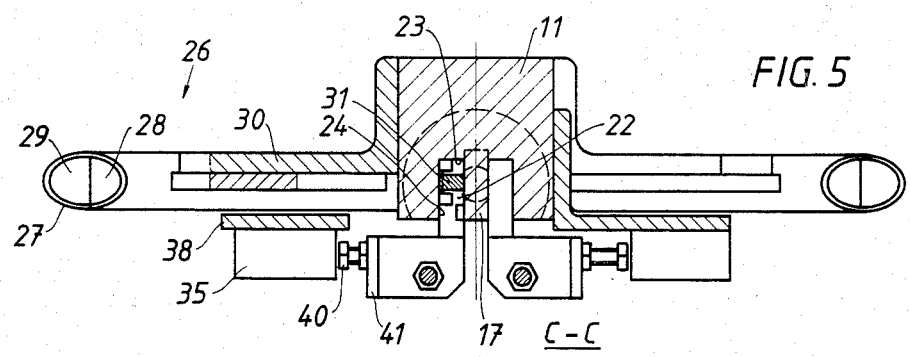
FIG. 5 is a section on the line C—C in FIG. 3.

In the drawings, 1 designates the upper part of a stem of a valve, the rest of which is not shown, the stem having, adjacent one end thereof, three grooves 2 between which are formed flanges 3. An annular washer 4 provides the support for one end of a valve spring 5 and is provided with a relatively elongated frustoconical bore 6. The washer 4 is axially fixed relative to the valve stem 1 by a two-part valve stem key (the halves of which are indicated at 7), which may be manufactured by axially splitting a frusto-conical sleeve with the same cone angle and size as the frusto-conical bore 6 in the washer 4. The key halves 7 are internally formed with grooves and flanges adapted to the grooves 2 and flanges 3 of the valve stem 1. The spring 5 urges the washer 4 outwards, whereby, due to the conicity of the key halves 7 and the taper of the bore in the washer, the key halves 7 are pressed with great force against the valve stem 1 to provide a very secure axial fixing.

The tool 10 comprises a rod 11 provided with a flange 12, which is resiliently connected to a plate 13 (see FIG. 4) by bolts 14 and cup springs 1. By means of the plate 13, the tool 10 can be attached to the arm of a robot (not shown). The rod 11 is provided with a milled-out recess 16. In the lower portion of the recess 16 a guide rail 17 is located, the outer end of which is provided with a recess 18, so that the guide rail 17 can be partially extended down over a valve stem 1, as is best shown in FIG. 7. At the lower end of the rod 11 a pressure element 20 is provided, which accommodates the upper end of the support washer 4 and acts to compress the spring 5. The guide rail 17, together with the recess 16 in the rod 11 and the recess 21 in the pressure element 20, forms a vertical transport channel 22 for the key halves 7. Guide surfaces in the transport channel 22 are provided by the bottom 23 and the side surfaces 24 in the recesses 16 and 21 of the rod 11 and the pressure element 20, respectively, and by the side surfaces of the guide rail 17 and the flange 17a of the guide rail 17. The rod 11 includes spring-loaded balls 25 which partially extend into the transport channel 22 and define stop means to capture key halves 7 falling under the influence of gravity from magazines 26. The magazines 26 and the balls 25 may be arranged in such a way that the key halves 7 already in the transport channel 22 constitute stops which prevent other key halves 7 in the magazines 26 from moving out into the transport channel 22. Further stop members (not shown), with appropriate operating means, can be used as stop means for the key halves in the magazines 26.

The magazines 26 consist of tubes 27 with a fill-up piece 28, which together form a channel 29 of semi-circular cross-section. The magazines are attached to the rod 11 by flanges 30.

Pressure rods 31 extend into the recess 16 and the transport channel 22 and act to move the key halves 7 past the stop means 25 downwards into the transport channel 22 from the position shown in FIG. 3 to the position shown in FIG. 6. These pressure rods 31 are operated by compressed air cylinders 32 which are mounted on the rod 11. Piston rods 33 of the cylinders 32 are joined to the pressure rods 31 by means of brackets 34.

The tool 10 also comprises indicating devices for ensuring that the assembly procedure is properly executed. These indicating devices may consist of inductive position switches 35, 36 and 37 on a holder 38 mounted on the rod 11. The position switches 35, 36 and 37 are influenced by arms 39 and 40 which are attached to a rod 41 fixed to the brackets 34.

MODE OF OPERATION OF FIRST EMBODIMENT

The tool 10 operates as follows. A work cycle is started by a handling robot presenting the tool to a loading station having a hopper containing key halves 7. The magazine 26 of the tool is then loaded with the number of key halves required for a particular engine, for example, light key halves for a four-cylinder engine. The tool is then brought to an assembly station supporting a cylinder head 43, part of which is shown in FIG. 6. The valves, the valve springs 5 and the washers 4 have previously been located in this cylinder head. The tool is next moved down to press the pressure element 20 and the washer 4 downwardly to compress the spring 5, as shown in FIG. 6. By means of the operating cylinders 32, the rods 31 are moved downwards, pressing two key halves 7 past the spring-loaded locking balls 25 and down through the transport channel 22. The key halves 7 are moved past the outer end of the valve stem 1, by the guide rail 17, and are tilted in towards the valve stem 1 by means of guiding edges 44 so that they adopt the lower positions shown in FIG. 6. The tool 10 is now lifted, allowing the spring 5 to move the washer 4 upwards. The lowermost flanges of the key halves 7 then enter the lowermost groove 2 on the valve stem 1, allowing the key halves to tilt inwards towards the valve stem 1 and the washer 4 to rise up around the key halves as far as is permitted by the bore 6 in the washer 4. The operating cylinders 32 hold the rods 31 pressed against the key halves 7 during this final stage of the upward movement of the washer 4. Locking of the valve spring 5 to the valve stem 1 has now been effected. The tool 10 is lifted further. The rods 31 are lifted up by their operating cylinders 32, whereby the lowermost key halves 7 in each magazine 26 fall down into the channel 22 to be captured by the locking balls 25 and assume the position shown for the key halves 7 in FIG. 3. The tool 10 is then brought to the next valve position and the operation is repeated.

The position switches 35, 36 and 37 confirm that the required two key halves have been correctly assembled. If one key half should be missing in the respective guide channel 22, this is indicated and a further movement of the slide 31 occurs, so that a key half in the magazine 26 is freed to run out into the channel 22. If, following a suitable number of repeated attempts to cause a key half 7 to run down into the channel 22, no key half appears in the channel, an alarm is raised to alert an operator of a fault. The position switches confirm that the spring packet has the correct height both prior to and after the assembly of the key halves.

DESCRIPTION OF SECOND EMBODIMENT

In the alternative embodiment shown in FIGS. 8–13, the tool comprises an assembly nozzle 50, the lower portion of which is formed in substantially the same way as the pressure element 20 shown in FIG. 3. In the nozzle 50, the pressure rods 31 of the assembly mechanism and a partition wall 51 are movably located. The partition wall 51 holds the two key halves 7 apart so that they may freely pass the upper end of the valve stem 1. The partition wall 51 is provided at its lower end with a recess so that it can straddle the top of the valve stem 1. In the lower portion of the assembly nozzle 50, two springs 52 are located which are designed to capture the key halves 7. That portion of a cylinder head which surrounds a valve spring 5 is designated 43. In the second embodiment, each magazine 26 consists of a tube 27 with a fill-up piece 28. Each magazine 26 is provided 27 with a fill-up piece 28. Each magazine 26 is provided with a feeding mechanism 54, by means of which only one key half 7 at a time can be released. Adjacent the channel 22 of the assembly nozzle 50 there are two inductive transducers 55, by means of which the passage of a key half 7 is detected.

MODE OF OPERATION OF SECOND EMBODIMENT

Figure 8:
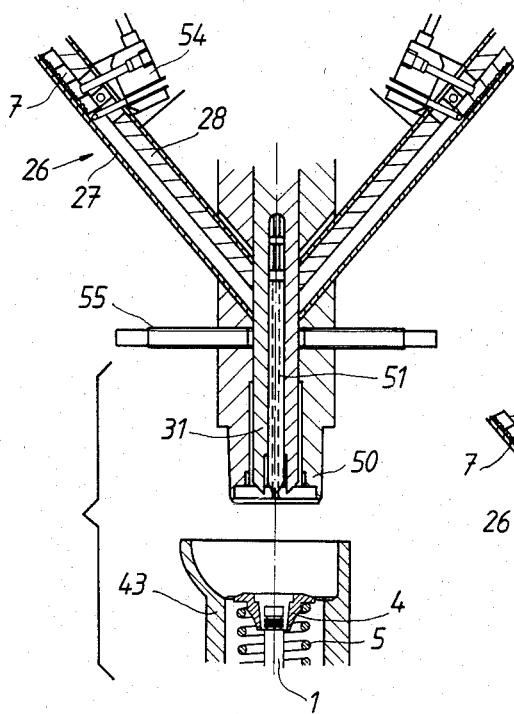

The assembly is carried out as follows. The tool is positioned directly above a valve in the cylinder head 43. The valve is surrounded by a spring 5 and a washer 4. This initial position is shown in FIG. 8.

Figure 9:
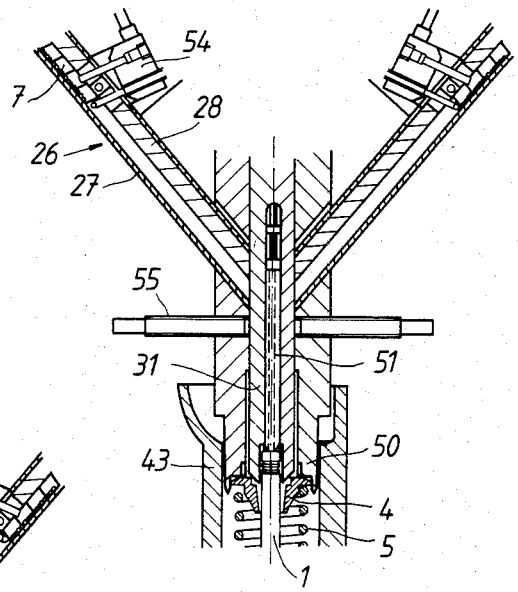

The assembly nozzle 50 is now lowered so that the washer 4 is pressed down to a position below its final locking position, as is shown in FIG. 9, thereby compressing the spring 5. The washer 4 is centered while being depressed, by the pointed ends of the rods 31.

Figure 10:
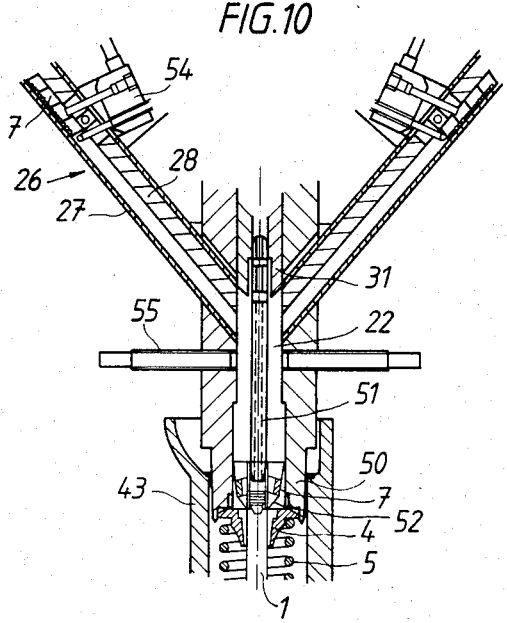

The rods are then withdrawn to the position shown in FIG. 10. The feeding mechanism is now activated so that one key half 7 from each magazine 26 is fed forward and falls down through the channel 22 to be captured at the lower portion thereof by the springs 52.

The transducers 55 indicate that both key halves have passed them.

Figure 11:
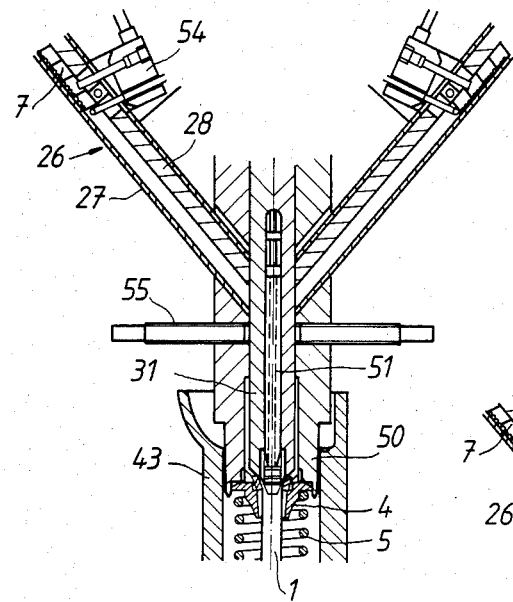

The pressure rods 31 are now lowered again and press the key halves 7 down into the correct positions relative to the valve stem 1, as shown in FIG. 11.

Figure 12:
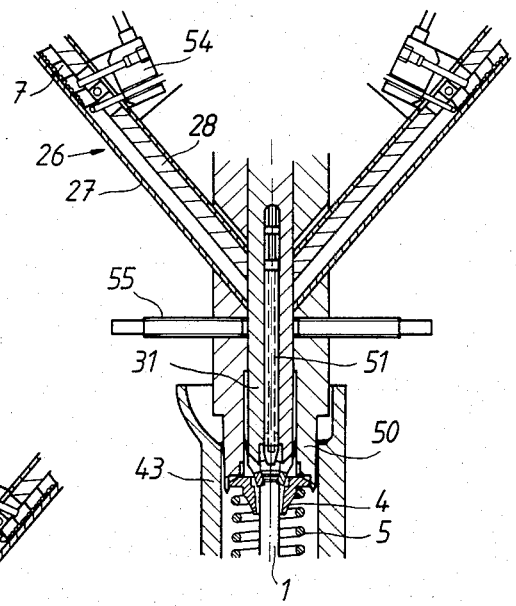
Figure 13:
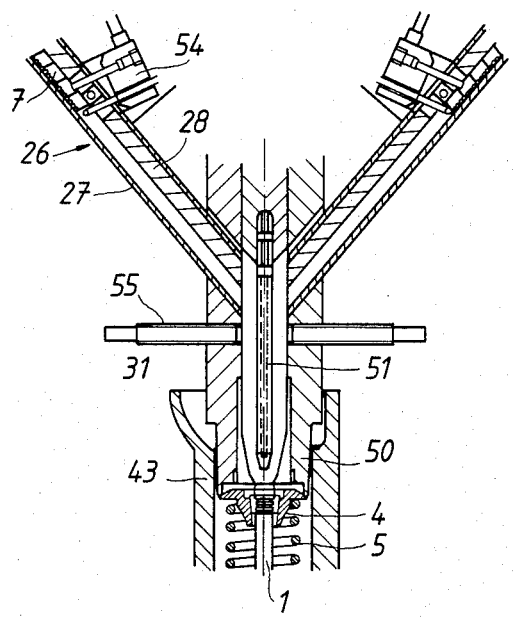

Next, as shown in FIG. 12, the partition 51 and the pressure rods 31 are lifted, allowing the springs 52 to press the key halves 7 inwardly against that portion of the valve stem 1 which is formed with the grooves 2 and the flanges 3. The assembly nozzle 50 is now lifted to the position shown in FIG. 13, allowing the washer 4 to be pushed upwards by the spring 5 around the key halves 7. In the position shown in FIG. 13, it is confirmed that the assembly has been properly carried out. This check on correct assembly can be carried out by moving the assembly nozzle 50 down towards the washer 4 to compress the spring 5 somewhat, for example by 1 mm. If the assembly has been correctly carried out, the power requirement increases instantaneously upon contact with the washer 4, which shows that the assembly has been correctly carried out. Following a satisfactory check on assembly, the tool is moved to the next valve position and the operation is repeated.

What is claimed is:

1. A tool for the automatic assembly of the two halves of a grooved split valve stem key around a grooved valve stem and within the bore of a washer retaining a valve-closing spring in a combustion engine, characterized in that the tool comprises connecting means for connecting the tool to a carrying member, a rod extending from said connecting means, said rod provided with a pressure element intended for compression of a valve spring, magazines carried by said rod for a number of retainer halves for cooperating with the valve stem key, a first channel in connection with said magazines for transporting said retainer halves from the magazines, said rod provided with means forming a second transport channel in connection with said first transport channel for transporting said halves to an assembly position, stop means for temporarily retaining a pair of said retainer halves in said second channel, guide members within said second transport channel for conducting said retainer halves past the grooved portion of a valve stem, transportation and positioning members for positioning and holding said retainer halves in an assembly position while the compression of a valve spring is reduced, and operating means upon said rod for operating said transportation and positioning members.

2. A tool according to claim 1, in which the magazines are provided with inclined guides forming said first channel.

3. A tool according to claim 1, in which said stop means in the second channel comprise spring loaded members protruding into said channel.

4. A tool according to claim 3, in which the stop means are arranged at the transition between the first and the second channel.

5. A total according to claim 1, in which said transportation and positioning members are movably arranged between an upper position with their lower end above the transition between the first and second channel and a lower position with said end at the lower end of the pressure element.

* * * * *